(12) United States Patent
Dana (10) Patent No.: US 11,288,722 B2
(45) Date of Patent: *Mar. 29, 2022

(54) ANONYMIZED ONLINE SHOPPING SYSTEM AND METHOD AND POINT OF SALE PRICING SYSTEM AND METHOD

(71) Applicant: Sean Patrick Dana, Fort Lauderdale, FL (US)

(72) Inventor: Sean Patrick Dana, Fort Lauderdale, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 17/021,589

(22) Filed: Sep. 15, 2020

(65) Prior Publication Data
US 2020/0410564 A1    Dec. 31, 2020

Related U.S. Application Data

(63) Continuation of application No. 16/426,408, filed on May 30, 2019, now Pat. No. 10,776,843.

(60) Provisional application No. 62/799,929, filed on Feb. 1, 2019.

(51) Int. Cl.
| | |
|---|---|
| G06Q 30/00 | (2012.01) |
| G06Q 30/06 | (2012.01) |
| G06Q 20/20 | (2012.01) |
| G06Q 30/02 | (2012.01) |

(52) U.S. Cl.
CPC ....... *G06Q 30/0615* (2013.01); *G06Q 20/201* (2013.01); *G06Q 30/0206* (2013.01)

(58) Field of Classification Search
None
See application file for complete search history.

(56) References Cited

U.S. PATENT DOCUMENTS

| | | | |
|---|---|---|---|
| 8,204,790 B1* | 6/2012 | Rogers | G06Q 30/0601 705/26.1 |
| 2003/0171994 A1* | 9/2003 | Walter | G06Q 20/04 705/14.73 |
| 2008/0184159 A1* | 7/2008 | Selig | G06F 40/174 715/781 |

(Continued)

OTHER PUBLICATIONS

M2 Presswire; "BuyMeStuff is recreating the Local Online Shopping Scenario in Australia"; Feb. 21, 2017; Normans Media Ltd (Year: 2017).*

*Primary Examiner* — Naeem U Haq
*Assistant Examiner* — Norman Donald Sutch, Jr.
(74) *Attorney, Agent, or Firm* — The Concept Law Group, PA; Scott D. Smiley; Scott M. Garrett (57) ABSTRACT

A retail service data center provides client facing web pages to allow users to remotely shop for items to be delivered from local retailers without either the users or the local retailer knowing the identity of each other. A retail service is used by shoppers that searches for items in nearby retail stores' inventory. The retail service allows the retail stores to match, or beat, an advertised price at which a given item is being offered by an online retailer. If the user decides to buy an item, the retail service conducts a first transaction with the retail service, which then uses the funds to buy the item from the local retailer. In addition, the retail service arranges for pick-up and delivery of the item by a local driving service. The identities of the buyer and the retailer are not made known to each other.

5 Claims, 10 Drawing Sheets

(56) References Cited

U.S. PATENT DOCUMENTS

| | | | |
|---|---|---|---|
| 2009/0012874 A1* | 1/2009 | Case | G06Q 30/0617 705/26.42 |
| 2013/0325645 A1* | 12/2013 | Thomas | G06Q 30/0615 705/26.3 |
| 2013/0325686 A1* | 12/2013 | Howes | G06Q 40/04 705/37 |
| 2014/0278903 A1* | 9/2014 | Wang | G06Q 30/0234 705/14.34 |
| 2015/0019384 A1* | 1/2015 | Fabian | G06Q 30/0613 705/26.81 |
| 2018/0308038 A1* | 10/2018 | Zhou | G06Q 10/063118 |
| 2019/0019146 A1* | 1/2019 | Chraibi | G08G 1/202 |
| 2019/0205834 A1* | 7/2019 | Bell | G06Q 10/08355 |

* cited by examiner

ANONYMIZED ONLINE SHOPPING SYSTEM AND METHOD AND POINT OF SALE PRICING SYSTEM AND METHOD

CROSS-REFERENCE TO RELATED APPLICATION

This application claims priority to, and is a continuation of U.S. patent application Ser. No. 16/426,408, which claims priority to Provisional Patent Application No. 62/799,929 filed Feb. 1, 2019, the entireties of each of which are hereby incorporated by reference.

FIELD OF THE INVENTIVE EMBODIMENTS

The present disclosure relates generally to technologies for enabling online commerce, and, more particularly, relates to a system for aggregating available shopping options from retailers local to the shopper in a way that avoids minimum advertised price agreements, and facilitates delivery of a purchased item by a local delivery service.

BACKGROUND OF THE INVENTIVE EMBODIMENTS

It is well known that online retail sales (i.e. internet commerce) has grown tremendously since the Internet and World Wide Web became commonly available in peoples' homes. The convenience of online ordering has had an effect on so-called "brick and mortar" retailers who operate shopping locations where people can browse products in person and buy products at these stores. At the same time, some online sellers have worked toward optimizing their delivery times, making online shopping more attractive to some shoppers. As a result, the brick and mortar retailers compete with online retailers, who do not have a publicly accessible building and the numerous costs that go with it. Worse, many online shoppers visit brick and mortar locations for "showrooming," where they can examine a product in person, and then, instead of purchasing from that store, they order the product from an online merchant. This adds insult to injury for the brick and mortar retailers who bear all the expense and receive no profits.

In recent years, a small number of online retailers have grown to become dominant in the online retail market. A common practice on some online retailers' web sites is to provide buying options that allow a user to select a seller from among many sellers offering an item. Different sellers can offer the item at different prices, for different shipping costs, and from different taxing jurisdictions, all of which can be taken into account by the user when making a purchase decision. However, as is common in the retail industry, retailers are often bound by minimum advertised pricing (MAP) policies with manufacturers. As a result, it is often difficult to find a product for sale, online or in brick and mortar locations, below the MAP price. This has left brick and mortar retailers often at a disadvantage because they are not able to offer prices lower than online retailers when subject to MAP policies. This is true even when people buy online for local pick up through a brick and mortar retailer's website. Considering the abundance of brick and mortar retail locations, there would otherwise be a tremendous resource for near-instant delivery/pickup but for the application of MAP policies.

Therefore, a need exists to overcome the problems with the prior art as discussed above.

SUMMARY OF THE INVENTIVE EMBODIMENTS

In accordance with some embodiments of the disclosure, there is provided a method for facilitating anonymous local retail sales that includes providing, from a retail service server to a client device, an interactive client-side web page that accepts an input from the client device. The inventive method can further include receiving, at the retail service server, from the client device, an input including an identification of a retail item and a location of a user of the client device, and identifying, by the retail service server, a plurality of merchants in an area around the location of the user, bounded by a preselected geographic limit. The method can further include transmitting, from the retail service server to each one of the plurality of merchants, an identification of the retail item, and receiving, at the retail service server, in response to transmitting the identification of the retail item, from at least some of the plurality of merchants, a price for the retail item at which the one of the retail merchants will sell the retail item using the retail service server. The method can further include identifying, by the retail service server, a location of at least one driver of a driving service within a bounded vicinity of the location of the user, and estimating a driving fee and delivery time based on the location of the at least one driver for each one of the at least some of the plurality of retail merchants and distance between each one of the at least some of the plurality of retail merchants and the location of the user. The method can still further include providing to the client device, a web page response including a listing showing the price for each one of the at least some retail merchants without identifying any of the retail merchants, and using a unique anonymous identifier for each one of the retail merchants, and the associated estimated delivery fee associated with each one of the retail merchants.

In accordance with another feature, the method can include receiving, from the client device at the retail service server, a selection of one of the unique anonymous identifiers. The feature can further include completing a first transaction between the client device and the retail service server for an amount substantially equal to the sum of the price of the retail item provided by the merchant corresponding to the selected unique anonymous identifier and the associated estimated delivery fee. The feature can further include completing a second transaction between the retail service server and the merchant corresponding to the selected unique anonymous identifier to generate an order with a unique order identifier, and without revealing an identity of the user of the client device. The feature can further include transmitting, from the retail service server to a selected driver of the driver service, order information including the order identifier and the identity of the retail merchant.

In accordance with another feature, the method can include receiving, from at least one of the merchants corresponding to the selected unique anonymous identifier of the selected driver, at the retail service server, an indication that the selected driver has picked up the retail item. The feature can further include receiving, from the selected driver, an indication that the retail item has been delivered to the location of the user of the client device.

In accordance with another feature, the method can include, in response to receiving the indication that the selected driver has picked up the retail item, the retail service server transmitting the location of the user to the selected driver.

In accordance with another feature, the method can include transmitting order information including the order identifier comprising transmitting a unique barcode identifier, and receiving the indication that the selected driver has picked up the retail item comprises receiving a scanned copy of the unique barcode identifier.

In accordance with another feature, the method can include providing the interactive client-side web page that accepts an input from the client device is performed in response to activating a browser extension that operates with a browser on the client device.

In accordance with some embodiments of the disclosure, there is provided method for dynamically determining a purchase price, the method including receiving a selected item from a potential customer, locating identifying information pertaining to the selected item, and scanning the identifying information pertaining to the selected item with a point-of-sale system of a merchant. The method can further include searching, by the point-of-sale system, at least one remote database for other merchants offering the selected item for sale, and determining prices of the selected item at which the other merchants are offering the selected item for sale. The method can further include offering the potential customer the selected item at a lowest determined price at which the selected item is offered for sale by the other merchants.

In accordance with another feature, scanning the identifying information comprises scanning a universal product code on packaging of the selected item.

In accordance with another feature, searching the at least one remote database comprises transmitting the universal product code to the at least one remote database.

In accordance with another feature, searching, by the point-of-sale system, the at least one remote database comprises sending a universal product code identifier to an anonymous retail service data center, and wherein determining prices of the selected item at which the other merchants are offering the selected item for sale is performed by the anonymous retail data center.

In accordance with another feature, the method can include, prior to searching the at least one remote database, prompting, by the point-of-sale system, to select a price match service, and receiving an input at the point-of-sale system of a selection of the price match service. Wherein the searching of the at least one remote database is performed in response to receiving the input.

In accordance with another feature, the method can include receiving, at a retail service data center, over an Internet connection from a user device, a retail item identifier and a location, determining, by the retail service data center, at least one retailer within a selected distance from the location, and the retail service data center querying the at least one retailer for a price of the retail item. The feature can further include indicating to the user, by the retail service data center, over the internet connection, the price of the retail item without indicating an identity of the at least one retailer.

In accordance with another feature, receiving the retail identifier and the location comprise receiving the retail item identifier and the location from a point-of-sale machine.

In accordance with another feature, receiving the retail identifier and the location comprise receiving the retail item identifier and the location from a client computer using a browser to access a web page of the retail service data center.

In accordance with another feature, receiving the retail item identifier and the location from a client computer using the browser comprises receiving the retail item identifier from a browser window created by a browser extension of the browser.

In accordance with another feature, the method can include determining, by the retail service data center, a deliver fee based on a distance from the at least one retailer to the location, and wherein indicating the price of the retail item further includes indicating the delivery fee.

In accordance with another feature, the method can include the retail service data center determining that the location corresponds with a retailer location of a competing retailer that is not the at least one retailer, and generating a coupon image for the retail item and transmitting the coupon image to the user device.

Although the inventive embodiments are illustrated and described herein as embodied in an online shopping system and method and point-of-sale pricing system and method, it is, nevertheless, not intended to be limited to the details shown because various modifications and structural changes may be made therein without departing from the spirit of the inventive embodiments and within the scope and range of equivalents of the claims. Additionally, well-known elements of exemplary embodiments of the disclosure will not be described in detail or will be omitted so as not to obscure the relevant details of the inventive embodiments.

Other features that are considered as characteristic for the inventive embodiments are set forth in the appended claims. As required, detailed embodiments of the present disclosure are disclosed herein; however, it is to be understood that the disclosed embodiments are merely exemplary of the general invention, which can be embodied in various forms. Therefore, specific structural and functional details disclosed herein are not to be interpreted as limiting, but merely as a basis for the claims and as a representative basis for teaching one of ordinary skill in the art to variously employ the present disclosure in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present disclosure is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

"In the description of the embodiments of the present disclosure, unless otherwise specified, azimuth or positional relationships indicated by terms such as "up", "down", "left", "right", "inside", "outside", "front", "back", "head", "tail" and so on, are azimuth or positional relationships based on the drawings, which are only to facilitate description of the embodiments of the present disclosure and simplify the description, but not to indicate or imply that the devices or components must have a specific azimuth, or be constructed or operated in the specific azimuth, which thus cannot be understood as a limitation to the embodiments of the present disclosure. Furthermore, terms such as "first", "second", "third" and so on are only used for descriptive purposes, and cannot be construed as indicating or implying relative importance.

In the description of the embodiments of the present disclosure, it should be noted that, unless otherwise clearly defined and limited, terms such as "installed", "coupled", "connected" should be broadly interpreted, for example, it may be fixedly connected, or may be detachably connected, or integrally connected; it may be mechanically connected, or may be electrically connected; it may be directly connected, or may be indirectly connected via an intermediate medium. As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the terms "program," "software application," and the like as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/dynamic load library and/or other sequence of instructions designed for execution on a computer system. Those skilled in the art can understand the specific meanings of the above-mentioned terms in the embodiments of the present disclosure according to the specific circumstances.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present disclosure.

DETAILED DESCRIPTION

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms. The embodiments of the inventive disclosure provide a novel and efficient anonymized online shopping system and method.

Figure 1:
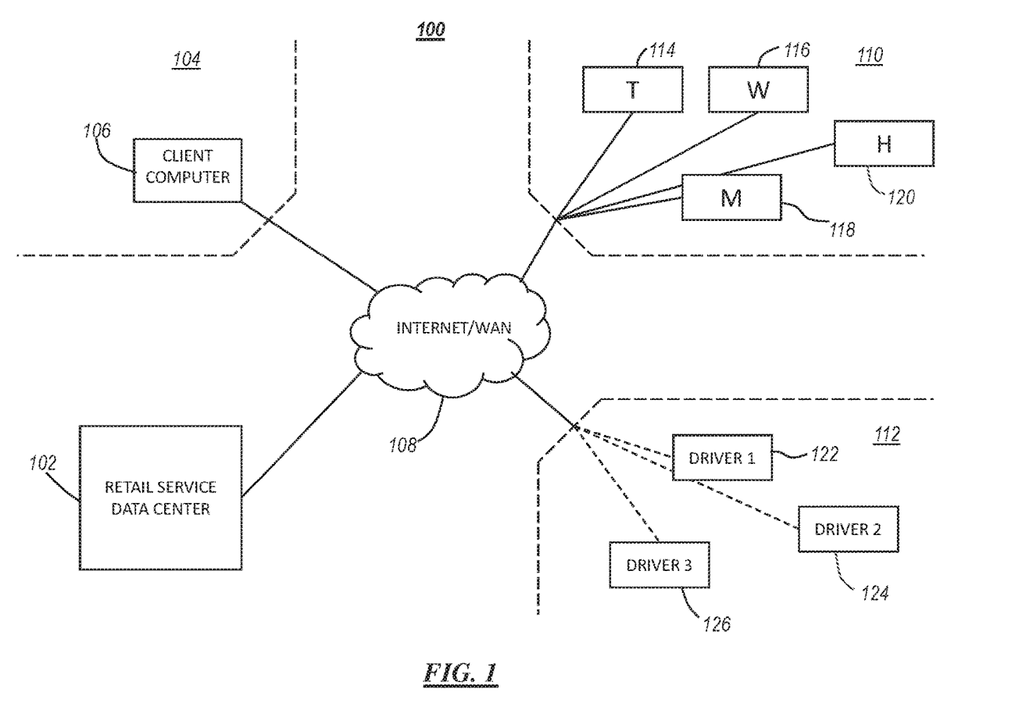
FIG. 1 is system diagram of an anonymized online shopping system, in accordance with some embodiments.

FIG. 1 is system diagram of an anonymized online shopping system 100, in accordance with some embodiments. In general, the system 100 is internet-based, using web protocols such as HTML5, HTTPS, along with various programming languages such as Javascript to provide interactive web pages, messaging between machines, and other internet-based activities, as is known. A retail service data center 102 includes one or more servers and other computing resources such as memory, long term non-volatile storage, databases, and so on. The retail service data center 102 is operated by a retail service and provides anonymized retail shopping service for users and merchants having physical locations of inventory. The retail service data center 102 is connected to the internet 108 and associated Wide Area Networks, such as cellular networks for connecting with mobile devices.

A plurality of users 104 are also connected to the internet 108 by their devices 106, which use web browser application programs to interact with, and render web page information received by various servers connected to the Internet 108, including servers of the retail service data center 102. Thus, the devices 106 act as client devices in a server-client arrangement using TCP/IP protocol and other similar protocols, as applicable. A single client computer 106 is shown in FIG. 1 for illustrative purposes only. The present disclosure contemplates interaction with a large number of client computers 106.

Further connected to the Internet 108 are a plurality of merchants 110, including merchants 114-120. Each one of these merchants have a physical location, which can include in-person retailing locations (e.g. stores). More typically, the merchants 114-120 are large retail chains that have numerous locations in regions of the country, or across the entire country. For example, WALMART has over 4000 locations and TARGET has almost 2,000 locations in the United States.

Further connected to the Internet 108 is a driving service 112, which includes a plurality of drivers 122-126. The drivers can be independent contractors associated with the driving service 112, such as Uber and/or Lyft, or other such services. Each driver 122-126 has a mobile device that runs an application program that can interact and communicate with the retail service data center 102.

In general, the retail service data center 102 provides an anonymized shopping service for users of client devices 106 by querying merchants 110 that have the merchandise that the users want to buy in locations near the users. Merchants can provide the product and pricing information to the retail service data center 102 in real time, in advance, or subsequent to said query. The location of the users 104 can be determined through known methods, such as locating the IP address being used by the client computer 106, receiving GPS information from the client computer 106, triangulation of wireless connections being used by the client computer 106, and more. In addition, the user 104 can enter a location to be used, even if the user 104 is not at that location. The retail service data center 102 is operable to receive/identify the location of drivers 122-126 and determine which are or will be in the vicinity of specific users 104 and merchants 114-120.

When the merchant product offerings meet the requirements of a given user query, the retail service data center provides the client device 106 with a listing of those offerings at one or more locations within a reasonable distance to the specified location, i.e., where the user 104 is located, where the client computer 106 is located, or a location manually entered by the user 104. In accordance with one embodiment of the present disclosure, the user 104 is not informed which merchant is offering each product. Instead, anonymized merchant identifiers can be used, but not necessarily, along with the price indicated by the corresponding merchant. The user 104 of the client device 106 can then select one of the product offerings and conduct a transaction with the retail service data center. In response, the retail service data center 102 conducts a separate transaction with the offering merchant, generating an order identifier. The order information can exclude any identifier indicating the identity of the user (e.g. the actual purchaser). The retail service data center 102 then notifies a driver 122-126, who then drives to the location of the particular merchant, picks up the item(s), and then drives to the location of the user to deliver the item(s). Upon delivery, the product will not indicate to the purchaser which merchant provided the product. However, a code is provided which includes information that can be used by the retail service data center 102 and, in accordance with one preferred embodiment, not by the purchaser, to determine which merchant provided the product. This is advantageous in the event a product needs to be returned by the purchaser to the providing merchant.

Figure 2:
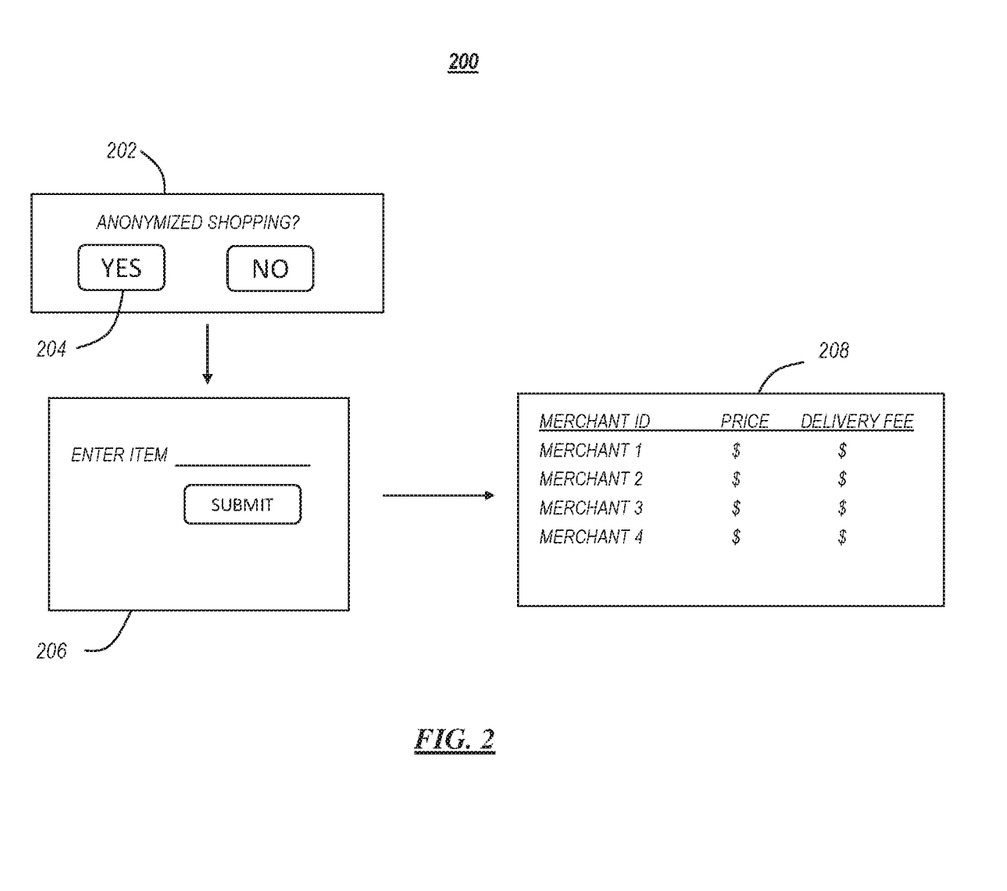
FIG. 2 is interface diagram showing examples of user interface pages presented to an online shopper at a client device operated by the online shopper, in accordance with some embodiments.

FIG. 2 is an interface diagram 200 showing examples of user interface pages presented to an online shopper at a client device 106 operated by the online shopper, in accordance with some embodiments of the present disclosure. The interfaces represent examples of web forms/pages rendered at a client device, such as client device 106, based on HTML and similar information received from the retail service data center 102. So, for example, when a user browses the website provided by the retail service data center 102, the user can be presented with a query form 202 that allows the user to select anonymized shopping or regular shopping. By clicking on the "YES" button 204, the user selects anonymized shopping and is presented with another form 206 in which the user can input search information for a product or item the user wants to purchase. The user can have an account set up that indicates the location of the user, the user can also provide a location with the query, or the user's location can be determined through know techniques, such as GPS location capability of the client device 106, IP address detection by the service data center 102 or reporting by the client device 106, or others. The user can then be presented with one or more pages of related items and products based on the information provided by the user in web pages, not shown here, but which are well known. Once the user selects a specific product, the retail service data center 102 can acquire pricing and delivery estimates, and present them in a selection interface 208. In the selection interface 208, the user is shown a listing of anonymized merchants (e.g. "merchant 1," "merchant 2") along with the price for the item charged by the corresponding merchant, and an estimated delivery fee. In addition to the delivery fee, the screen 208 can also show an estimated delivery time or time range in which the item can likely be delivered to the user.

Figure 3:
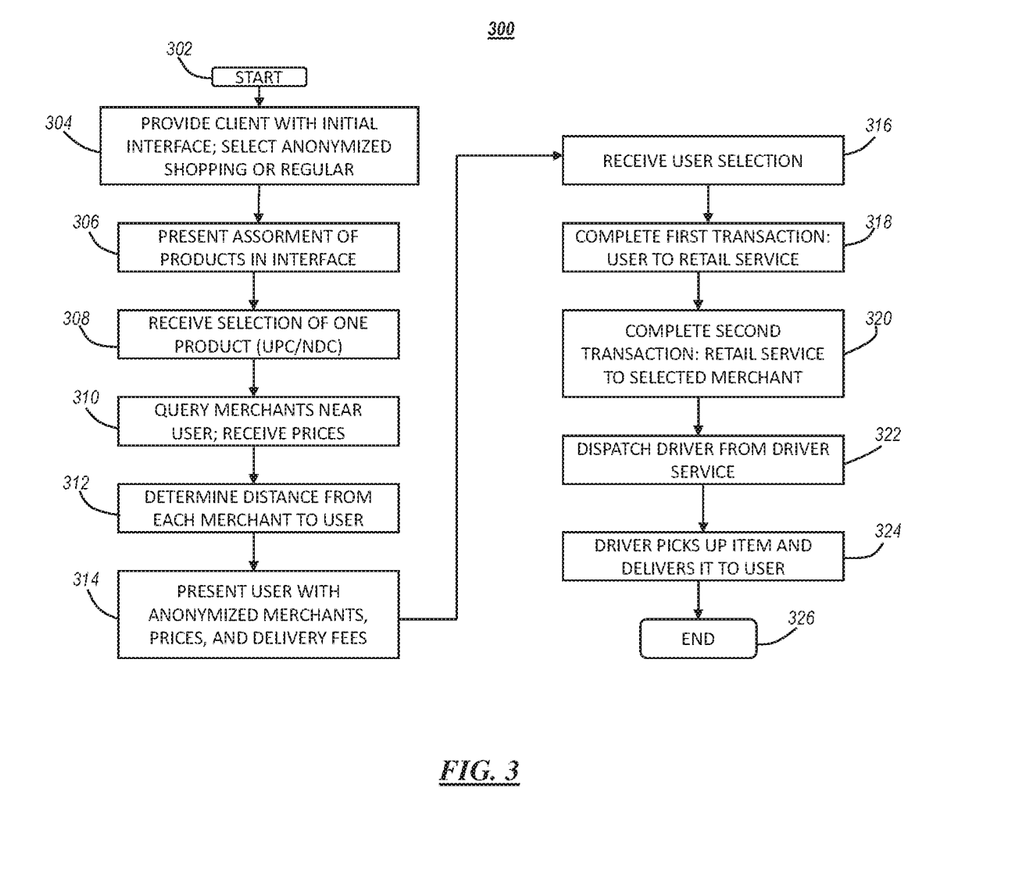
FIG. 3 is a flow chart diagram of a method for providing online anonymized shopping, in accordance with some embodiments.

FIG. 3 is a flow chart diagram of a method 300 for providing online anonymized shopping, in accordance with some embodiments. At the start 302, the user can log onto a retail service server in the retail service data center. In step 304 the user is presented with a web page that is rendered by the browser program on the user's client device that can be similar to that of screen form 202 where the user can select anonymized shopping or regular shopping. The user can then provide information into the form that may be generic or specific. In step 306 the retail service server creates a web page showing an assortment of products that match or are related to the search information provided by the user. The user can then browse through the items, and either select one or provide different search criteria/query information.

When the user selects an item, then, in step 308, the retail service server receives the selection and, in step 310, the retail service server queries one or more merchant servers of merchants who have locations in the vicinity of the user. The distance from each merchant location to the user can be determined in step 312 using a mapping application or map service API, and the distance can be used to estimate a delivery fee for delivering the item to the user from the merchant locations.

In step 314, the user can be presented with another web page generated by the retail service server that lists the merchants using aliases to anonymize the merchants, along with the price indicated by each merchant in response to step 310, and the delivery fee for each merchant location estimated in step 312, as well as an estimated delivery time. The user will not know the identity of the merchants, and is only presented with, for example, pricing, delivery fee, and delivery time information (and any applicable tax). The user is able to select any of the presented merchants in step 316.

As a result of making a selection, a "check out" process is completed in step 318, as a first transaction, where the retail service receives funds, e.g., credit card confirmation, from the user. In step 320 a second transaction is competed between the merchant corresponding to the selection made by the user in step 316 and the retail service server 102. This creates an order at the merchant that includes order information that can exclude the identity of the user, including the address or location of the user. Personnel at the merchant location can then prepare the order by pulling the item(s) from inventory and packaging them or otherwise readying the item(s) for pick up. In step 322, a driver associated with a driving service can be commissioned to pick up the ordered item(s) and drive them to the user's location for delivery in step 324. The driver can be provided with an order identifier that is presented to the merchant upon arriving at the merchant location. In some embodiments the order information sent by the retail service can include some unique, scannable information such as, for example, a bar code. The driver can scan this information using the driver's mobile device, and send it to the retail service server to confirm pick up. In response, if the user location is not provided in the order information, then the retail service server can send the delivery destination to the driver. The driver then drives to the user's location and delivers the item(s), completing step 324, whereupon the method ends 326.

Figure 4:
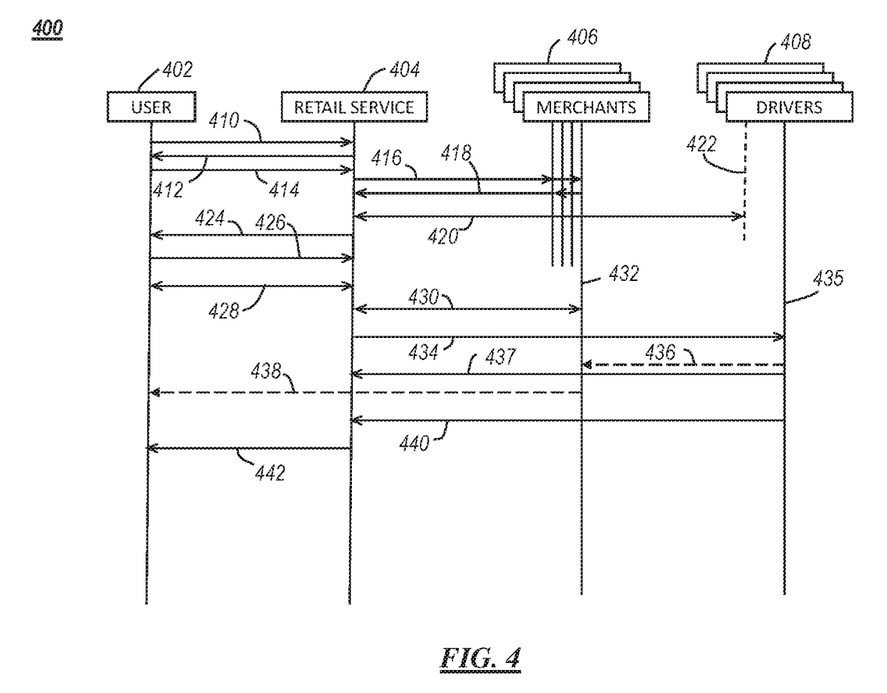
FIG. 4 is a messaging diagram of an anonymized online shopping event, in accordance with some embodiments.

FIG. 4 is a messaging diagram of an anonymized online shopping process 400, in accordance with some embodiments. The process 400 involves the same entities shown in FIG. 1, including a user 402, a retail service 404, merchants/retailers 406, and drivers 408. The messaging or event flow described here follows the method 300 of FIG. 3.

Accordingly, the user 402 can first log onto or otherwise browse or access the website of the retail service 404 in request 410. In response the retail service 404 provides 412 HTML/Javascript code for rendering browsing pages at the client device of the user 402. The browsing web pages can be interactive, presenting product information that is either stored at the retail service data center or acquired from merchant web service data centers in response to the queries by the user. In message 414 the user indicates a selection of an item to purchase. In message 416 the retail service 404 sends queries to a plurality of merchants 406, that each, individually, return a message 418 indicating a price at which the merchant will sell the item. In message 420 the retail service 404 also messages a driving service 422 (e.g. a driving service API) to query the locations of drivers in the region near the user 402. Message 420 is shown as a two-way message here, and the driving service 422 returns the locations of drivers.

In message 424 the retail service 404 provides the pricing and delivery information to the user 402. In message 426 the user indicates a selection of one of the items, and in 428 a transaction occurs where the user provides funds to the retail service. Then, in a second transaction 430, the retail service 404 orders and pays for the item from the selected merchant 432. The retail service 404 also sends a request to a selected driver 435 in message 434 to pick up and deliver the item. The message 434 can include order information so that the driver can identify the order. Similarly, after selecting a driver, the retail service can provide a driver identifier to the selected merchant 432. Event 436 represents the driver 435 driving to the location of the selected merchant 432 to pick up the ordered item. In event 437 the driver 435 can provide confirmation to the retail service 404 that the item has been picked up. In event 438 the driver then drives from the selected merchant 432 to the location of the user 402 to deliver the item(s), and the driver 435 can provide a delivery complete message 440 to the retail service 404. Finally, in event 442, the retail service 404 can indicate that the item has been delivered to the user 402.

In accordance with one embodiment of the present disclosure, the system optimizes drivers by routing them to other merchants for pick-ups while that driver is on his way to deliver items already picked up. For example, if the driver is traveling from Merchant 1 to Customer 1, the system can route the driver to stop by Merchant 2 to pick up items for Customer 2 before the driver goes to the location specified by Customer 1. Further, with some orders, a customer might have ordered items from more than one merchant. In these situations, the system can route a driver to stop at each of the multiple merchants to pick up the items before the driver stops at the location specified by the customer. In other situations, it would be more efficient for the system to instruct separate drivers to make stops at the different locations and for them to each separately deliver the items to the location specified by the customer. In yet another embodiment, the system, in pursuit of efficiency, can have Driver 1 pick up an item ordered by Customer from Merchant 1. The system can have Driver 2 pick up an item ordered by Customer from Merchant 2. The system can then, by knowing the deliver location of (or specified by) Customer and the location of Driver 1, Driver 2, Merchant 1, and Merchant 2, instruct Driver 1 and Driver 2 to meet each other prior to delivery so that Driver 1 can give his items to Driver 2 and that only one delivery is made to Customer with all of his ordered items. This is more convenient to Customer and allows Driver 1 to immediately continue serving other customers.

Figure 5:
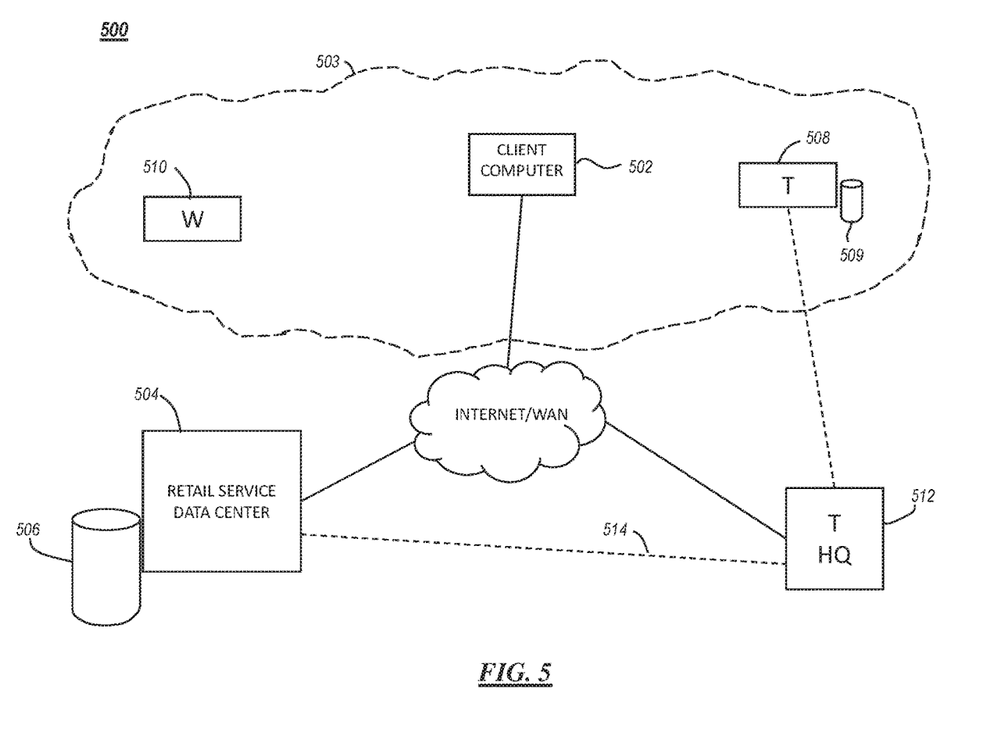
FIG. 5 is a system diagram of on anonymized online shopping system, in accordance with some embodiments.

FIG. 5 is a system diagram of on anonymized online shopping system 500, in accordance with some embodiments. Similar to that of FIG. 1, the system 500 shows an example of an embodiment in which a merchant web service is used as a proxy for the various store locations of the merchant. Accordingly, a user of a client computing device 502 is located in a geographic region 503 that can include several stores 508, 510 of different merchants. Each of the stores 508, 510 maintain real time inventory of merchandise they have for sale. The user can use the client computing device 502 to conduct an online shopping session with any of the numerous online merchants. The online merchants operate e-commerce web sites that allow a person to select items, pay for them, and then receive them by commercial shipping several days later, or a day later for a very high "next day" delivery fee. However, the stores 508, 510 may be willing to meet a competitive price of the online merchant. To determine if the same item can be found locally for a suitable price, keeping in mind the more immediate availability, the user of the computing device 502 can access a web service provided by a retail service data center 504. During a browsing session established between the client computer 502 and the retail service data center 504 the client computer 502 can provide either identifying information of an item of merchandise, or search through a listing of items stored in a database 506 maintained by the retail service data center 504. The client computer 502 can also indicate a location that dictates the boundary of the region 503. In that way the retail service data center 504 can act like an online retailer by providing a shopping interface to search through items maintained in the database 506. For each item there can be file or record that include, for example, pictures of the item, text description of the item, links to reviews of the item, and so on, all of which can be rendered in a browser interface at the client computer 502. Once the user selects an item of interest, and possible purchase, the retail service data center can contact several retail store data centers such as data center 512, as indicated by dashed line 514. The retail service data centers 504 can provide a product identifier to the retailer data center 512, along with an indication of the location of the region 503 or the user of the client computer 502. The retailer data center 512 can identify store 508 as being in region 503, and can query the inventory record 509 of the store 508 in which the real time or near-real time inventory is maintained to determine if the store 508 has the item in stock. When it does have the item in stock, the retailer data center 512 can then respond to the retail service data center 504 with a price for the item that can be below an advertised price. The retail service data center 504 can then determine a deliver fee based on the distance from the store 508 to the location of the person using the client computer 502, and provide a total price to the user of the client computer 502. If the user then agrees to the price, then the process of FIG. 3 can then be conducted to pay for and arrange delivery of the item from store 508 to the user of the client computer 502.

Figure 6:
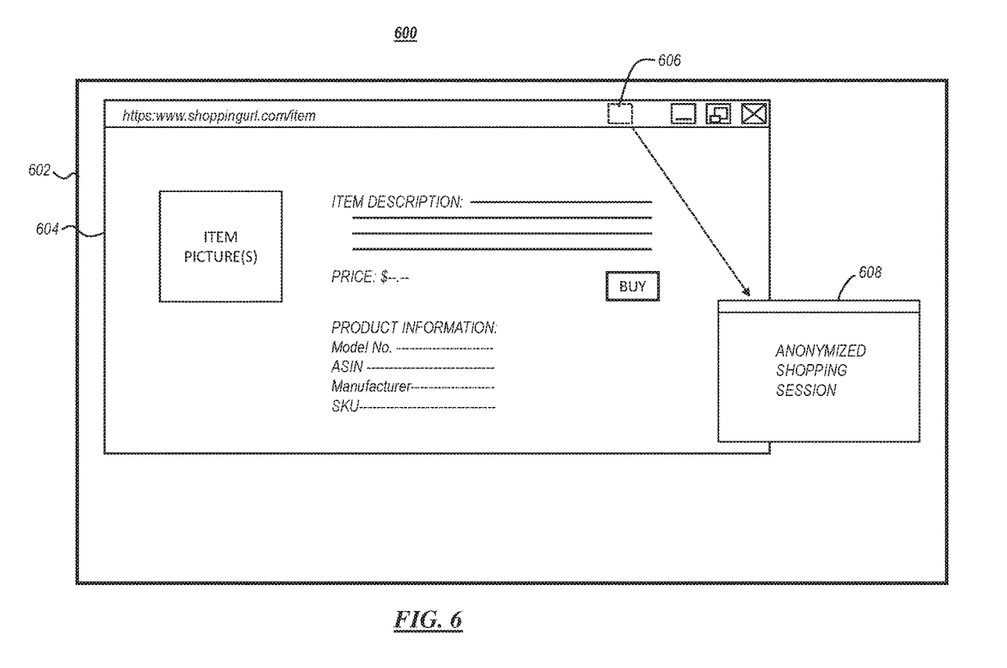
FIG. 6 is a web page interface of a browser having a browser extension that initiates an anonymized online shopping session, in accordance with some embodiments.

FIG. 6 is a web page interface diagram 600 of a browser having a browser extension that initiates an anonymized online shopping session, in accordance with some embodiments. A graphical display 602 is used by a computer to present information, as is well known, and can display a browser window 604. The user of the computer can use the browser to browse merchandise being offered for sale on an online merchant's website. As is typical, the browser will receive HTML and often JavaScript code to render the view of the merchandise page in the browser window 604. Accordingly, the browser window 604 can render pictures of the item, formatted text for a product description, product information, a price, and a "buy" button to enter the item into an online shopping cart, for example.

As is known, many browsers support extensions, which are separate software entities that extend the functionality of the browser, and in many cases act like an application program that operates in conjunction with the browser. It is contemplated than an anonymized shopping browser extension can be installed into a browser, providing an activation button 606 in a portion of the browser window 604. Upon clicking on the activation button 606, the anonymized shopping browser extension can extract the product information from the code used to render the web page view in the browser window 604. The product information can include standard product information, including model number, price, manufacturer name, and so on, which can be used to locate identical items in retail stores in the vicinity of the person using the computer on which the browser is operating. The anonymized shopping browser extension can open a separate window 608 for an anonymized shopping session that can present an interface similar to that of FIG. 2, or another interface format, and the process of anonymized shopping such as that indicated in FIGS. 3-5 are performed using the product information obtained from the browser window 604.

The present disclosure also contemplates a point-of-sale (POS) system that is operable to dynamically determine the price of a product at any given moment based on current market conditions. In accordance with one embodiment, a customer will locate an item within a merchant's facility that the customer is interested in purchasing. However, unlike traditional stores, there is no price tag or price provided for that item. Instead, in order to determine the price, the customer will need to bring the item to the POS system located at the front of the store or, possibly, alternate locations within the store. Once the item is scanned by the novel POS system and identified, the system will then search the Internet to determine the lowest price that item is being offered for sale online. Ideally, the merchant will then offer that item to the customer for the same price it is being offered online, including the shipping costs that would be required for the item to reach the customer.

Advantageously, through use of the novel system, brick and mortar merchants can offer to customers the comfort of knowing that the price they will be paying is comparable to the price they will find the item online. Advantageously, this will disincentivize customers from using brick-and-mortar merchants as fitting rooms or showrooms to look at items before they purchase them online. As a more detailed example, a customer may enter a physical store and pick up a children's toy and bring it to the register. Because the customer knows that the merchant is using the present disclosure to determine prices, the customer can be confident that he or she will not find a better deal anywhere else. Once the toy is scanned at the register, the system will then check online merchants, such as, AMAZON, for online sellers offering the same SKU. At the merchant register, one or more of the lowest-priced offerings will be shown to the merchant, who can then offer that price to the customer.

Figure 7:
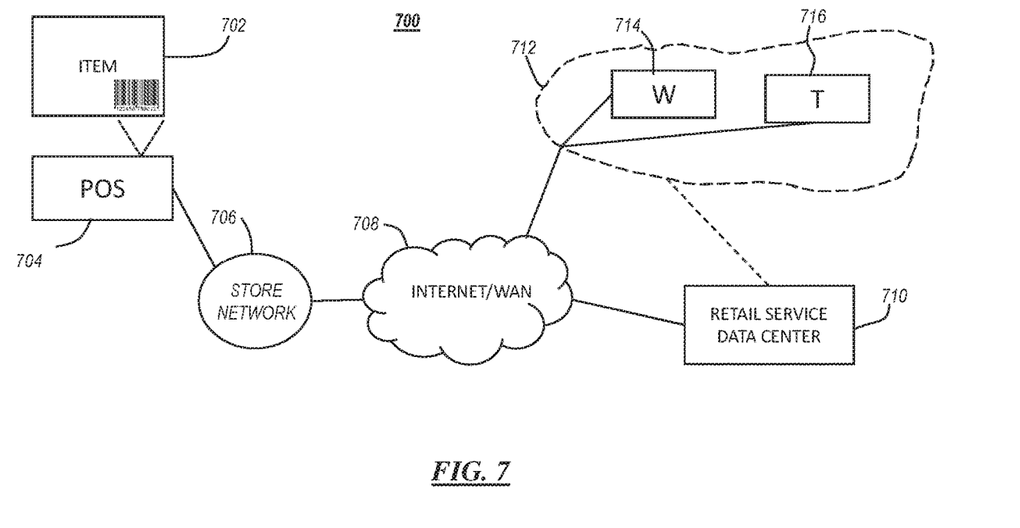
FIG. 7 is an anonymized shopping system using an in-store point of sale machine to compare prices with local competitors, in accordance with some embodiments.

FIG. 7 is an anonymized shopping system 700 using an in-store point of sale (POS) machine 704 to compare prices with local competitors, in accordance with some embodiments. The POS machine 704 can be used to scan an item 702 that a person is interested in purchasing. The scanning process can include optical recognition of a Universal Product Code (UPC) symbol (e.g. a "barcode") on the packaging of the item 702. The UPC is an encoded number that uniquely identifies the item 702, and is used by other retailers and merchants. Similarly, for pharmaceutical products, a National Drug Code (NDC) can be represented as a graphically encoded number. Upon scanning the item 702, the POS machine can offer the user a price match option to match a lower price for the item as offered at any nearby merchant store locations. In some embodiments the price match service can be offered at a fee or as part of a membership by the business in which the POS machine 704 is located. To commence the price match process, the POS machine 704 can forward the product information and price through a store network 706, over the internet 708 to a retail service data center 710 (RSDC). The RSDC 710 can anonymously query pricing servers of nearby stores 714, 716 in the region 712 where the POS machine 704 is located. The results of the query can be reported back to the POS machine 704 and if one of the competing stores 714, 716 have the item 704 at a lower price, or offer it through anonymized shopping at a lower price (e.g. as in the process of FIGS. 3-4), then the POS machine 704 can discount the price of the item 702 to substantially match that of the competing store 714, 716.

Figure 8:
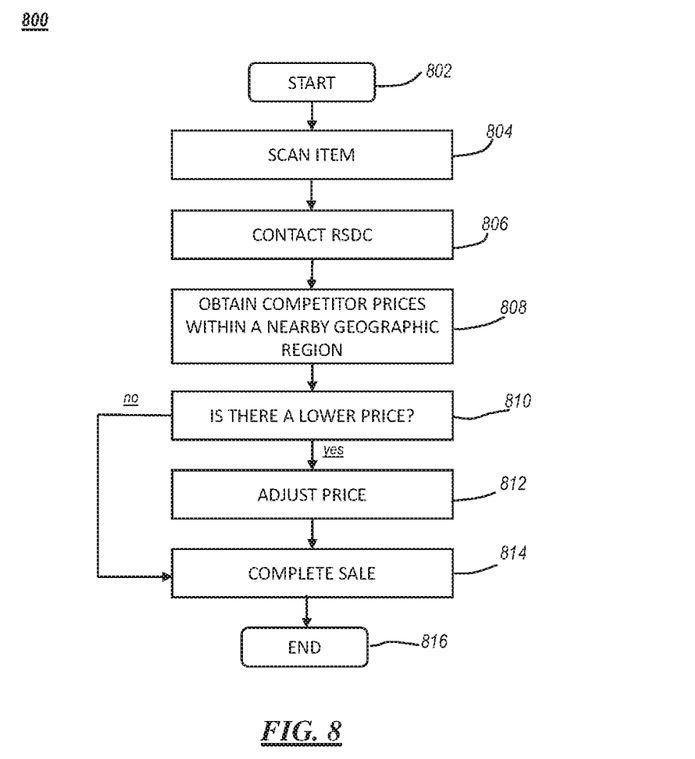
FIG. 8 is a flow chart diagram of a method for anonymized shopping system using an in-store point of sale machine, in accordance with some embodiments.

FIG. 8 is a flow chart diagram of a method 800 for anonymized shopping system using an in-store POS machine, in accordance with some embodiments. The method 800 can be implemented in the system 700 of FIG. 7, as well as similar systems and arrangements. At the start 802 of the method 800 a shopper in a store can bring an item to a POS machine, whereupon the UPC/NPC or equivalent identifying indicia on the packaging of the item can be located and then scanned in step 804. Scanning involves an optical recognition process that decodes the UPC/NPC or similar indicia to obtain an identifier. In step 806 the POS machine can transmit the product information to a RSDC in an anonymized shopping session. The retail service data center can then, in step 808, query the prices of the same item at stores in the regional vicinity or the price from online vendors, regardless of location. Each store (brick and mortar or online) queried can return a price at which the store is presently offering the item for sale, and the pricing information can be returned to the POS machine. Then a comparison is made in step 810 to determine if there is a lower price for the item. If the received pricing information for the queried stores indicates the store where the POPS machine is located has the lowest price, then the method 500 proceeds to step 814 to complete the transaction, if the shopper wishes. When there is a lower price for the item at a nearby store, then from step 810 the method proceeds to step 812 where the POS machine can adjust the price of the item that has been set by the store where the POS machine is located. The adjusted price can be adjusted to be equal to the lower price, or within some range of the lower price (lower or higher). In some embodiments the price adjustment can be based on a distance to the store having the lower price. In still further embodiments a weighting of price and distance can be calculated for each store considered in step 808, and the lowest of the weighted price can be used as the adjusted price in step 812. In weighting the price adjustment, the farther a competing store is from the store at which the POS machine is located, the less of a discount can be applied. A scaling factor can be applied to the difference in prices where the farther the competing store is, the smaller the scaling factor. By weighting price adjustments, the store where the POS machine is located can still sell the item at a lower cost than originally offered, but without having to cut profit as much as would be required to match the competitor's price on the assumption that the shopper would rather pay a slightly higher price than travel to other stores. After adjusting the price in step 812, then the method can proceed to step 814 where the sale can be completed (if the shopper desires), and then the method 500 can end 816.

Figure 9:
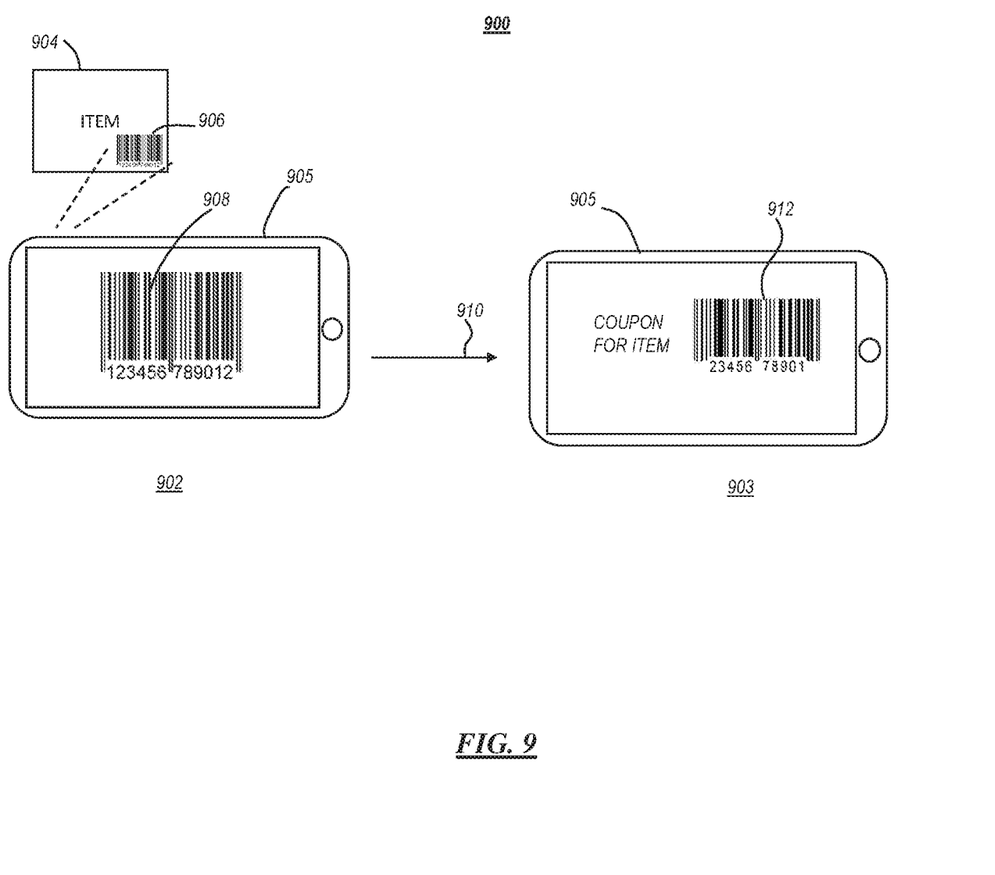
FIG. 9 shows a mobile device used in an anonymized shopping session to obtain a price adjusting coupon, in accordance with some embodiments.

FIG. 9 shows a mobile device used in an anonymized shopping session 900 to obtain a price adjusting coupon, in accordance with some embodiments. The mobile device 905 can be, for example, a cellular phone device that has installed therein an anonymized shopping application program. The mobile device 905 is shown in a shopping mode 902, and then in a result mode 903. An item 904 can be located within a store in which the user of the mobile device 905 is shopping. Upon finding the item 904, the user can use the mobile device in the shopping mode 902 to scan a UPC/NPC 906 on the packaging of the item 904. Generally mobile devices include a camera which can be used to optically recognize the UPC/NPC 906. During the process of recognizing and decoding the UPC/NPC 906, the image 908 in the view of the camera can be displayed on a graphical display of the mobile device 905. The UPC/NPC information can be sent to a retail service data center along with location information (e.g. GPS coordinates). The retail service data center can then infer, based on the location information, the store in which the mobile device 905 is located, and can query the store, and other stores in the region or online vendors, to obtain the pricing information from each store for the item 904. If there is a lower price at which the item 904 is being offered at another store, then a coupon 912 can be formulated and transmitted to the mobile device, as indicated by arrow 910. The coupon 912 can be formulated in agreement with the store in which the mobile device 905 is located. Upon taking the item 904 to a POS to purchase the item 904, the coupon 912 can be presented and scanned at the POS to affect a price adjustment reflecting the lower price at which a competitor is offering the item 904. The price adjustment of the coupon 912 can be based on a weighted determination as described herein regarding FIG. 8. Furthermore, the coupon 912 can have a relatively short viability period, such as on the order of one or two hours, after which the coupon 912 expires and is no longer valid. The retail service data system can then disallow any new coupons for a period of time (e.g. one day) for the item 904 for the particular mobile device 905 or the account established with the application program running on the mobile device 905 in order to encourage people to buy the item.

In other embodiments the device 905 is a scanning device supplied by the store. In these embodiments, a customer brings an item to the counter and the item is scanned by device 905, for example, an optical gun, and the visual code on the device is interpreted by the gun device 905.

Figure 10:
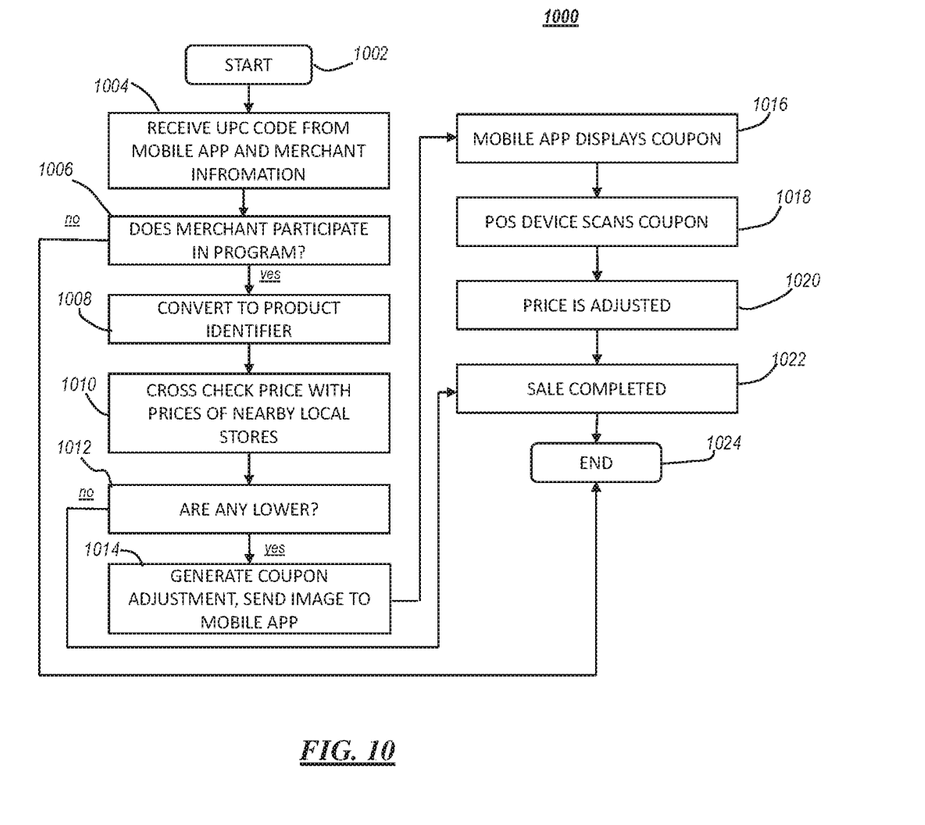
FIG. 10 is a flow chart diagram of a method for an anonymized shopping session to obtain a price adjusting coupon, in accordance with some embodiments.

FIG. 10 is a flow chart diagram of a method 1000 for an anonymized shopping session to obtain a price adjusting coupon, such as that of FIG. 9, in accordance with some embodiments. At the start 1002 a user can be located in a store, having found an item that the user is interested in purchasing. The user further has a mobile device running an anonymized shopping application program. Using the mobile device, then, the user can scan the UPC/NPC or equivalent indicia on the packaging of the item. The optical scanning and recognition is facilitated by the anonymized shopping application program utilizing the camera of the mobile device. Once the UPC/NPC is processed at the mobile device, it is then sent, in step 1004, to a retail service data center. Additional information is also sent so that the identity of the store can be determined or indicated. Upon receiving the UPC/NPC information the retail service data center can determine, based on the information received in step 1004, whether the merchant who operates the store in which the item was scanned participates in the coupon program. If not, then the method is terminated (end 1024). However, in step 1006, when it is determined that the merchant does participate in the coupon program, the method proceeds to step 1008 where the UPC/NPC can be converted to product identifier, if necessary. In some embodiments the UPC/NPC code itself can be used. In step 1010, the retail service data center then check on the price of the item as offered by competitor stores in the same region. A comparison is then made upon receiving results of the query in step 1010 to determine if any of the prices are lower. When there is a lower price, the method 1000 can proceed to step 1014, otherwise to step 1022 to complete the sale (or not). In step 1014 a coupon code can be generated which is approved by the merchant in which the mobile device is located, and then sent to the mobile device. The coupon, when timely used, will cause the POS at the location of the merchant to discount the price of the item. Thus, at the point of sale, in step 1016, the mobile device can present the coupon for scanning by the POS machine in step 1018. In step 1020 the POS machine then applies the agreed upon discount to adjust the price, and then the sale is complete in 1022, and the method 1000 ends 1024.

An anonymized shopping system has been disclosed that improves e-commerce technology by allowing users to access potentially lower, unadvertised prices in exchange for not knowing the source of the products. This is accomplished by providing a technology that, upon receiving a query from a customer about an item, identifies merchants nearby the customer's geographic location, and requesting a price for the item from the merchants. Further, the technology identifies delivery drivers in the vicinities of those merchants in order to determine a delivery fee. A total price can be presented to the customer for each merchant/driver combination. The technology also acts as a transactional middleman, making the purchase from a selected merchant, which prevents the merchant from knowing the identity of the customer as well. The item can then be delivered the same day, even within a much shorter time than conventional warehouse online merchants.

What is claimed is:

1. A method for facilitating anonymous local retail sales, comprising:
   providing, from a retail service server to a client device, an interactive client-side web page that accepts an input from the client device;
   receiving, at the retail service server, from the client device, an input including an identification of a retail item and indication of a location of a user of the client device;
   determining, by the retail service server, based on the indication of the location of the user of the client device, a geographic location of the user;

identifying, by the retail service server, a plurality of merchants in an area around the location of the user, bounded by a preselected geographic limit;

transmitting, from the retail service server to each one of the plurality of merchants, an identification of the retail item;

receiving, at the retail service server, in response to transmitting the identification of the retail item, from at least some of the plurality of merchants, a price for the retail item at which the one of the retail merchants will sell the retail item using the retail service server;

identifying, by the retail service server, a location of at least one driver of a driving service within a bounded vicinity of the location of the user;

estimating a driving fee and delivery time based on the location of the at least one driver for each one of the at least some of the plurality of retail merchants and distance between each one of the at least some of the plurality of retail merchants and the location of the user;

providing to the client device, a web page response including a listing showing the price for each one of the at least some retail merchants without identifying any of the retail merchants, and using a unique anonymous identifier for each one of the retail merchants, and the associated estimated delivery fee associated with each one of the retail merchants;

receiving, from the client device at the retail service server, a selection of one of the unique anonymous identifiers;

completing a first transaction between the client device and the retail service server for an amount substantially equal to the sum of the price of the retail item provided by the merchant corresponding to the selected unique anonymous identifier and the associated estimated delivery fee;

completing a second transaction between the retail service server and the merchant corresponding to the selected unique anonymous identifier to generate an order with a unique order identifier, and without revealing an identity of the user of the client device; and transmitting, from the retail service server to a selected driver of the driver service, order information including the unique order identifier and the identity of the retail merchant.

2. The method of claim 1, further comprising receiving, from the merchant corresponding to the selected unique anonymous identifier, at the retail service server, an indication that the selected driver has picked up the retail item; and receiving at the retail service server, from the selected driver, an indication that the retail item has been delivered to the location of the user of the client device.

3. The method of claim 2, wherein, in response to receiving the indication that the selected driver has picked up the retail item, the retail service server transmitting the location of the user to the selected driver.

4. The method of claim 2, wherein transmitting order information including the order identifier comprises transmitting a unique barcode identifier; and receiving the indication that the selected driver has picked up the retail item comprises receiving a scanned copy of the unique barcode identifier.

5. The method of claim 1, wherein providing the interactive client-side web page that accepts an input from the client device is performed in response to activating a browser extension that operates with a browser on the client device.

* * * * *